US006506478B1

(12) United States Patent
Schulz

(10) Patent No.: US 6,506,478 B1
(45) Date of Patent: Jan. 14, 2003

(54) INKJET PRINTABLE MEDIA

(75) Inventor: Mark F. Schulz, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 46 days.

(21) Appl. No.: 09/591,592

(22) Filed: Jun. 9, 2000

(51) Int. Cl.[7] ..................... B32B 27/14; B32B 3/00
(52) U.S. Cl. ..................... 428/195
(58) Field of Search ..................... 428/195, 204, 428/206, 220, 327, 332, 341, 500

(56) References Cited

U.S. PATENT DOCUMENTS

| | | | | |
|---|---|---|---|---|
| 4,048,271 | A | 9/1977 | Kesting | 264/41 |
| 4,090,662 | A | 5/1978 | Fayling | 235/493 |
| 4,247,498 | A | 1/1981 | Castro | 264/41 |
| 4,371,582 | A | 2/1983 | Sugiyama et al. | 428/341 |
| 4,384,047 | A | 5/1983 | Benzinger et al. | 521/64 |
| 4,396,643 | A | 8/1983 | Kuehn et al. | 427/160 |
| 4,419,388 | A | 12/1983 | Sugiyama et al. | 427/288 |
| 4,429,015 | A | 1/1984 | Sheptak | 428/201 |
| 4,442,172 | A | 4/1984 | Oshima et al. | 428/342 |
| 4,451,582 | A | 5/1984 | Denzinger et al. | 521/38 |
| 4,452,843 | A | 6/1984 | Kaule et al. | 428/199 |
| 4,460,637 | A | 7/1984 | Miyamoto et al. | 428/212 |
| 4,496,629 | A | 1/1985 | Haruta et al. | 428/341 |
| 4,503,111 | A | 3/1985 | Jaeger et al. | 428/195 |
| 4,539,256 | A | 9/1985 | Shipman | 428/315.5 |
| 4,595,931 | A | 6/1986 | Toganoh et al. | 346/1.1 |
| 4,613,441 | A | 9/1986 | Kohno et al. | 210/500.36 |
| 4,630,891 | A | 12/1986 | Li | 350/105 |
| 4,649,064 | A | 3/1987 | Jones | 427/256 |
| 4,701,837 | A | 10/1987 | Sakaki et al. | 346/135.1 |
| 4,726,989 | A | 2/1988 | Mrozinski | 428/315.5 |
| 4,732,786 | A | 3/1988 | Patterson et al. | 427/261 |
| 4,749,084 | A | 6/1988 | Pereyra | 206/459 |
| 4,775,594 | A | 10/1988 | Desjarlais | 428/421 |
| 4,781,985 | A | 11/1988 | Desjarlais | 428/421 |
| 4,812,352 | A | 3/1989 | Debe | 428/142 |
| 4,830,902 | A | 5/1989 | Plantenga et al. | 428/207 |
| 4,833,172 | A | 5/1989 | Schwarz et al. | 521/62 |
| 4,861,644 | A | 8/1989 | Young et al. | 428/195 |
| 4,867,881 | A | 9/1989 | Kinzer | 210/490 |

(List continued on next page.)

FOREIGN PATENT DOCUMENTS

| | | | |
|---|---|---|---|
| DE | 30 24 205 A1 | 1/1982 | |
| EP | 0 233 703 A2 | 8/1987 | |
| EP | 0 350 257 A1 | 1/1990 | B41M/1/30 |

(List continued on next page.)

*Primary Examiner*—Bruce H. Hess
*Assistant Examiner*—B. Shewareged
(74) *Attorney, Agent, or Firm*—Crompton, Seager & Tufte LLC

(57) ABSTRACT

An ink receptive media suitable for use in a passport is disclosed. A media in accordance with the present invention comprises a substrate, and an image receptive layer comprising a plurality of particles. In a preferred embodiment, the image receptive layer comprises a plurality of crosslinked poly(vinylpyrrolidone) particles.

67 Claims, 4 Drawing Sheets

U.S. PATENT DOCUMENTS

| | | | | | |
|---|---|---|---|---|---|
| 4,892,779 | A | | 1/1990 | Leatherman et al. | 428/220 |
| 4,900,620 | A | | 2/1990 | Tokita et al. | 428/330 |
| 4,930,814 | A | | 6/1990 | Nusmeier | 283/109 |
| 4,935,307 | A | | 6/1990 | Iqbal et al. | 428/500 |
| 4,954,395 | A | | 9/1990 | Hasegawa et al. | 428/318.4 |
| 4,966,804 | A | | 10/1990 | Hasegawa et al. | 428/203 |
| 4,968,063 | A | | 11/1990 | McConville et al. | 283/72 |
| 4,986,868 | A | | 1/1991 | Schmidt | 156/249 |
| 5,027,131 | A | | 6/1991 | Hasegawa et al. | 346/1.1 |
| 5,059,983 | A | | 10/1991 | Higuma et al. | 346/1.1 |
| 5,060,981 | A | | 10/1991 | Fossum et al. | 283/109 |
| 5,068,140 | A | | 11/1991 | Malhotra et al. | 428/216 |
| 5,084,340 | A | | 1/1992 | Light | 428/327 |
| 5,102,731 | A | | 4/1992 | Takimoto et al. | 428/323 |
| 5,118,570 | A | | 6/1992 | Malhotra | 428/474.4 |
| 5,120,594 | A | | 6/1992 | Mrozinski | 428/195 |
| 5,126,195 | A | | 6/1992 | Light | 428/327 |
| 5,134,198 | A | | 7/1992 | Stofko, Jr. et al. | 525/205 |
| 5,139,598 | A | | 8/1992 | Chou et al. | 156/234 |
| 5,141,797 | A | | 8/1992 | Wheeler | 428/195 |
| 5,192,617 | A | | 3/1993 | Stofko, Jr. et al. | 428/411.1 |
| 5,198,306 | A | | 3/1993 | Kruse | 428/481 |
| 5,206,071 | A | * | 4/1993 | Atherton et al. | 428/195 |
| 5,208,092 | A | | 5/1993 | Iqbal | 428/195 |
| 5,219,928 | A | | 6/1993 | Stofko, Jr. et al. | 525/57 |
| 5,241,006 | A | | 8/1993 | Iqbal et al. | 525/196 |
| 5,277,811 | A | | 1/1994 | Moya | 210/500.3 |
| 5,302,436 | A | | 4/1994 | Miller | 428/195 |
| 5,302,437 | A | | 4/1994 | Idei et al. | 428/195 |
| 5,326,619 | A | | 7/1994 | Dower et al. | 428/164 |
| 5,336,558 | A | | 8/1994 | Debe | 428/323 |
| 5,342,688 | A | | 8/1994 | Kitchin et al. | 428/402 |
| 5,370,763 | A | | 12/1994 | Curiel | 156/277 |
| 5,374,475 | A | | 12/1994 | Walchli | 428/304.4 |
| 5,376,727 | A | | 12/1994 | Iqbal et al. | 525/196 |
| 5,380,044 | A | | 1/1995 | Aitkens et al. | 283/67 |
| 5,389,723 | A | | 2/1995 | Iqbal et al. | 525/57 |
| 5,407,893 | A | | 4/1995 | Koshizuka et al. | 593/227 |
| 5,410,642 | A | | 4/1995 | Hakamatsuka et al. | 395/113 |
| 5,422,178 | A | | 6/1995 | Swenson et al. | 428/343 |
| 5,429,860 | A | | 7/1995 | Held et al. | 428/195 |
| 5,435,599 | A | | 7/1995 | Bernecker | 283/70 |
| 5,443,727 | A | | 8/1995 | Gagnon | 210/490 |
| 5,462,708 | A | | 10/1995 | Swenson et al. | 264/174.11 |
| 5,464,254 | A | | 11/1995 | Campbell et al. | 283/109 |
| 5,472,789 | A | | 12/1995 | Iqbal et al. | 428/483 |
| 5,534,320 | A | | 7/1996 | Raby | 428/42.1 |
| 5,537,137 | A | | 7/1996 | Held et al. | 347/105 |
| 5,545,280 | A | | 8/1996 | Wenz | 156/234 |
| 5,569,529 | A | | 10/1996 | Becker et al. | 428/331 |
| 5,589,259 | A | | 12/1996 | Hosoi et al. | 428/323 |
| 5,591,527 | A | | 1/1997 | Lu | 428/411.1 |
| 5,595,403 | A | | 1/1997 | Garrison | 283/74 |
| 5,599,765 | A | | 2/1997 | Ohshima et al. | 503/227 |
| 5,629,093 | A | | 5/1997 | Bischof et al. | 428/411.1 |
| 5,658,411 | A | | 8/1997 | Faykish | 156/233 |
| 5,660,919 | A | | 8/1997 | Vallee et al. | 428/206 |
| 5,681,660 | A | | 10/1997 | Bull et al. | 428/500 |
| 5,683,774 | A | | 11/1997 | Faykish et al. | 428/40.1 |
| 5,686,602 | A | | 11/1997 | Farooq et al. | 536/101 |
| 5,688,738 | A | | 11/1997 | Lu | 503/227 |
| 5,707,722 | A | | 1/1998 | Iqbal et al. | 428/304.4 |
| 5,710,588 | A | | 1/1998 | Malhotra | 347/153 |
| 5,721,086 | A | | 2/1998 | Emslander et al. | 430/126 |
| 5,747,148 | A | | 5/1998 | Warner et al. | 428/212 |
| 5,756,188 | A | | 5/1998 | Reiter et al. | 428/195 |
| 5,766,398 | A | | 6/1998 | Cahill | 156/240 |
| 5,786,298 | A | | 7/1998 | Tsou et al. | 503/227 |
| 5,795,425 | A | | 8/1998 | Brault et al. | 156/235 |
| 5,807,461 | A | | 9/1998 | Hagstrom | 156/361 |
| 5,811,493 | A | | 9/1998 | Kent | 525/92 F |
| 5,830,561 | A | | 11/1998 | Hagner | 428/195 |
| 5,837,351 | A | | 11/1998 | Chernovitz et al. | 428/195 |
| 5,837,365 | A | | 11/1998 | Chung | 428/318.8 |
| 5,837,375 | A | | 11/1998 | Brault et al. | 428/411.1 |
| 5,846,647 | A | | 12/1998 | Yoshino et al. | 428/328 |
| 5,858,514 | A | | 1/1999 | Bowers | 428/195 |
| 5,874,145 | A | | 2/1999 | Waller | 428/42.1 |
| 5,890,742 | A | | 4/1999 | Waller | 283/67 |
| 5,928,789 | A | | 7/1999 | Chen et al. | 428/413 |
| 5,939,469 | A | | 8/1999 | Fussnegger et al. | 523/161 |
| 5,952,104 | A | | 9/1999 | Sugiyama et al. | 428/409 |
| 5,958,564 | A | | 9/1999 | Iwamoto et al. | 428/212 |
| 5,965,256 | A | | 10/1999 | Barrera | 428/354 |
| 5,969,069 | A | | 10/1999 | Su et al. | 526/318 |
| 5,976,671 | A | | 11/1999 | Gleim | 428/172 |
| 6,001,482 | A | | 12/1999 | Anderson et al. | 428/409 |
| 6,080,261 | A | | 6/2000 | Popat et al. | 156/240 |
| 6,124,417 | A | | 9/2000 | Su | 526/318 |
| 6,165,593 | A | | 12/2000 | Brault et al. | 428/195 |

FOREIGN PATENT DOCUMENTS

| | | | | |
|---|---|---|---|---|
| EP | 0 380 133 | A1 | 1/1990 | |
| EP | 0 484 016 | A1 | 5/1992 | |
| EP | 0 716 931 | A1 | 6/1996 | |
| EP | 0 718 384 | A2 | 6/1996 | |
| EP | 0 802 245 | A1 | 10/1997 | |
| EP | 0 904 953 | A1 | 3/1999 | |
| JP | 61-41585 | | 2/1986 | |
| JP | 61-261089 | | 11/1986 | |
| JP | 11-296658 | | 10/1999 | |
| WO | WO 88/06532 | | 9/1988 | |
| WO | WO 92/07722 | | 5/1992 | |
| WO | WO 93/01938 | | 2/1993 | |
| WO | WO 95/06564 | | 3/1995 | B41M/3/12 |
| WO | WO 95/30547 | | 11/1995 | B41M/7/00 |
| WO | WO 97/07991 | | 3/1997 | B44C/1/16 |
| WO | WO 97/15457 | | 5/1997 | |
| WO | WO 98/05512 | | 2/1998 | |
| WO | WO 98/29516 | | 7/1998 | |
| WO | WO 99/10184 | | 3/1999 | |
| WO | WO 99/45375 | | 9/1999 | |
| WO | WO 99/55537 | | 11/1999 | |
| WO | WO 99/56682 | | 11/1999 | A61F/13/02 |
| WO | WO 00/00352 | | 1/2000 | |
| WO | WO 00/47421 | | 8/2000 | F41M/5/00 |

* cited by examiner

INKJET PRINTABLE MEDIA

FIELD OF INVENTION

The present invention relates generally to inkjet printable media. More particularly, the present invention relates to security documents such as passports.

BACKGROUND OF THE INVENTION

There are numerous security documents which comprise a paper substrate. Examples of security documents comprising a paper substrate include, certificates (e.g., stock certificates), negotiable instruments (e.g., checks), passports, and visas. A passport typically includes one or more sheets of paper. Often, a photograph of the person to whom the passport is issued is placed onto the paper and laminated in place using a transparent polymer film. One of the shortcomings of this construction is that the photograph is raised from the page and may be carefully removed by a skilled counterfeiter and replaced with a different photograph.

A common complaint made by passport holders is that the photograph is often not a flattering portrait. This complaint is so widespread that writers and performers who specialize in humor have addressed this subject. For example, one book of humorous stories was titled, “When You Look Like Your Passport Picture it’s Time to Come Home”. Fortunately for travelers, digital camera technology has become increasingly wide-spread and economical in recent years. For example, many portrait studios now use digital cameras.

When a portrait is taken with a digital camera, the cost of taking multiple shots is very low. The low cost allows several images to be taken. These images can all be viewed immediately on a computer screen, and the subject may choose the ones he or she likes best. The unflattering images can be discarded, and the desirable images can be saved electronically. A hard copy of the desirable images can also be created using a printer, for example, an inkjet printer.

In recent years, the price of inkjet printers has come down dramatically. At the same time, the quality of the images produced by inkjet printers has dramatically improved. Today, an inkjet printer capable of producing near photographic quality images can be purchased at any large electronics retailer.

SUMMARY OF THE INVENTION

The present invention relates generally to inkjet image retaining assembly. More particularly, the present invention relates to security documents such as passports. The invention is directed to a class of ink-receptive translucent coating materials which may be applied to paper based documents including security papers to provide a robust, durable, high quality, and tamper resistant image after processing.

Ink receptive media in accordance with the present invention comprise a substrate, and an ink receptive layer comprising a plurality of particles. In a particularly preferred embodiment, the ink receptive layer comprises a plurality of crosslinked poly(vinylpyrrolidone) particles. In a useful embodiment of the present invention, the particles of the ink receptive layer define interstitial spaces. In a preferred embodiment of the present invention, the particles of the ink receptive layer define a plurality of tortuous paths extending between a first major surface and a second major surface of the ink receptive layer. It is believed that the plurality of tortuous paths may allow a fluid vehicle of the ink composition to pass through the ink receptive layer to be carried away by the substrate. In a particularly preferred embodiment, the ink receptive layer is capable of capturing most of the ink colorants near a first major surface of the ink receptive layer while allowing most of a fluid vehicle of the ink to pass through the ink receptive layer and to be carried away by the substrate.

In one embodiment of the present invention, a laminate is heat sealed over the first major surface of the ink receptive layer. In a preferred embodiment, the ink receptive layer has a thickness of between about 2 microns to about 100 microns dry. In a more preferred embodiment, the ink receptive layer has a thickness of between about 5 microns to about 50 microns dry. It is believed an ink receptive layer in accordance with these preferred embodiments may allow material from the laminate to flow through the ink receptive layer and bond to the substrate.

Ink receptive compositions in accordance with the present invention are useful to modify paper to render it printable to obtain an acceptable image with aqueous inks, particularly from an inkjet printer. Images printed on paper to which the ink receptor composition has been applied are of excellent image quality compared to printed images on paper without the ink receptor composition. The ink receptor composition of this invention is especially useful for security documents and other applications where a heat sealable laminate is to be adhered to the imaged article.

One embodiment of a multi-layered structure in accordance with the present invention includes a substrate and an ink receptive layer comprising one or more projections overlaying a top surface of the substrate. The multi-layered structure also includes a laminate having a top layer and a bottom layer. The material of the bottom layer of the laminate preferably extends between the projections of the ink receptive layer and contacts the top surface of the substrate.

DETAILED DESCRIPTION OF THE INVENTION

Figure 1:
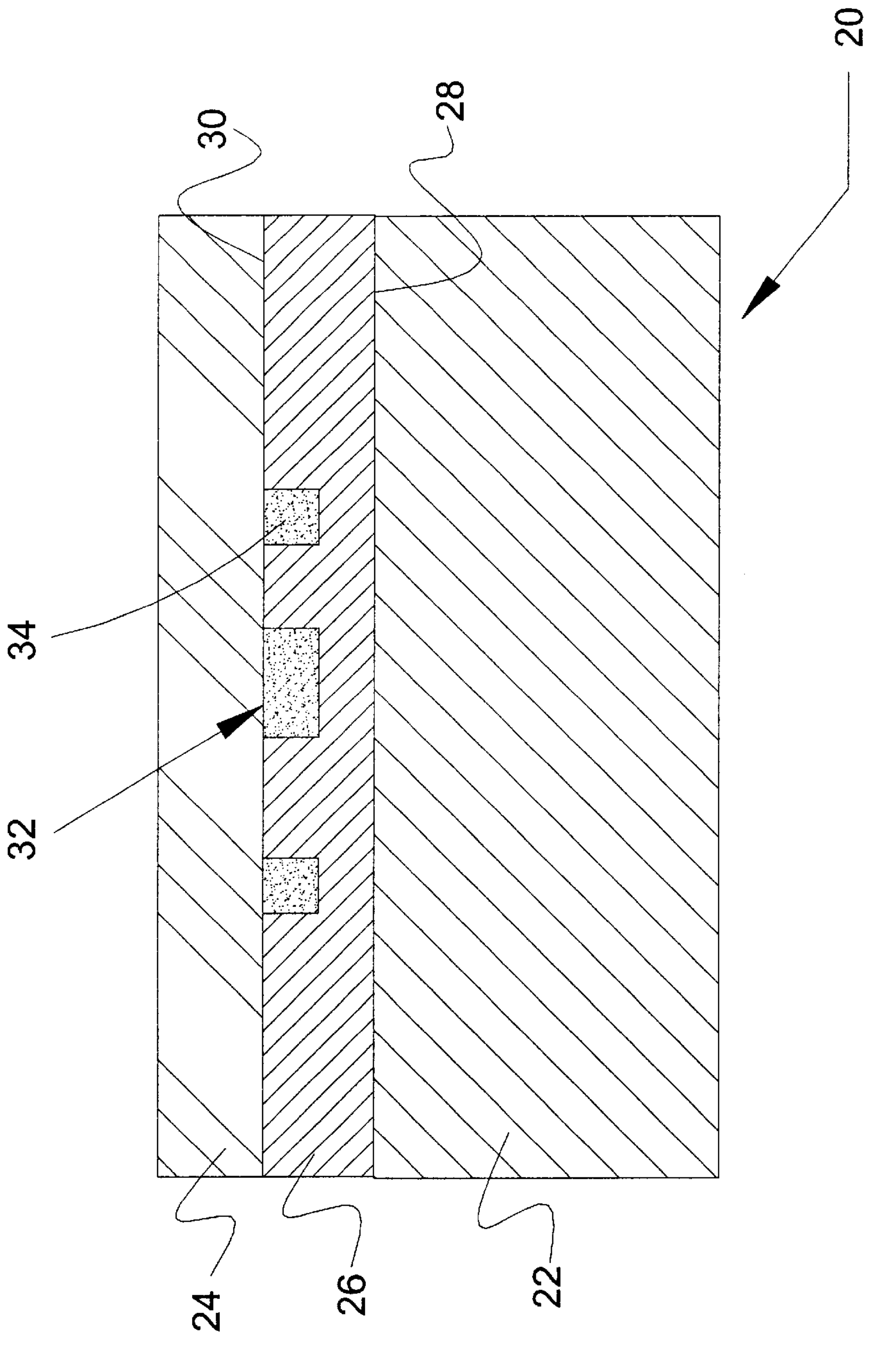
FIG. 1 is a cross-sectional view of a multiple-layered structure in accordance with an exemplary embodiment of the present invention.

The following detailed description should be read with reference to the drawing. The drawing is diagrammatic in nature and not necessarily to scale. Examples of constructions, materials, dimensions, and manufacturing processes are provided for various elements. Those skilled in the art will recognize that many of the examples provided have suitable alternatives which may be utilized.

FIG. 1 is a cross-sectional view of a multi-layered structure 20 in accordance with the present invention. Multi-layered structure 20 includes a substrate 22 and a laminate 24 overlaying substrate 22. An ink receptive layer 26 is disposed between substrate 22 and laminate 24. Ink receptive layer 26 includes a first major surface 30 and a second major surface 28. A printed image 32 comprising an ink 34 is disposed proximate ink receptive layer 26. In a preferred embodiment, multi-layered structure 20 forms a portion of a secure document which is robust, durable, and tamper resistant. Also, in a preferred embodiment, a secure bond is formed between substrate 22, ink receptive layer 26, and laminate 24. In this preferred embodiment, substrate 22 will tear and/or printed image 32 will divide into two or more parts if a counterfeiter attempts to separate the components of multi-layered structure 20.

Figure 2:
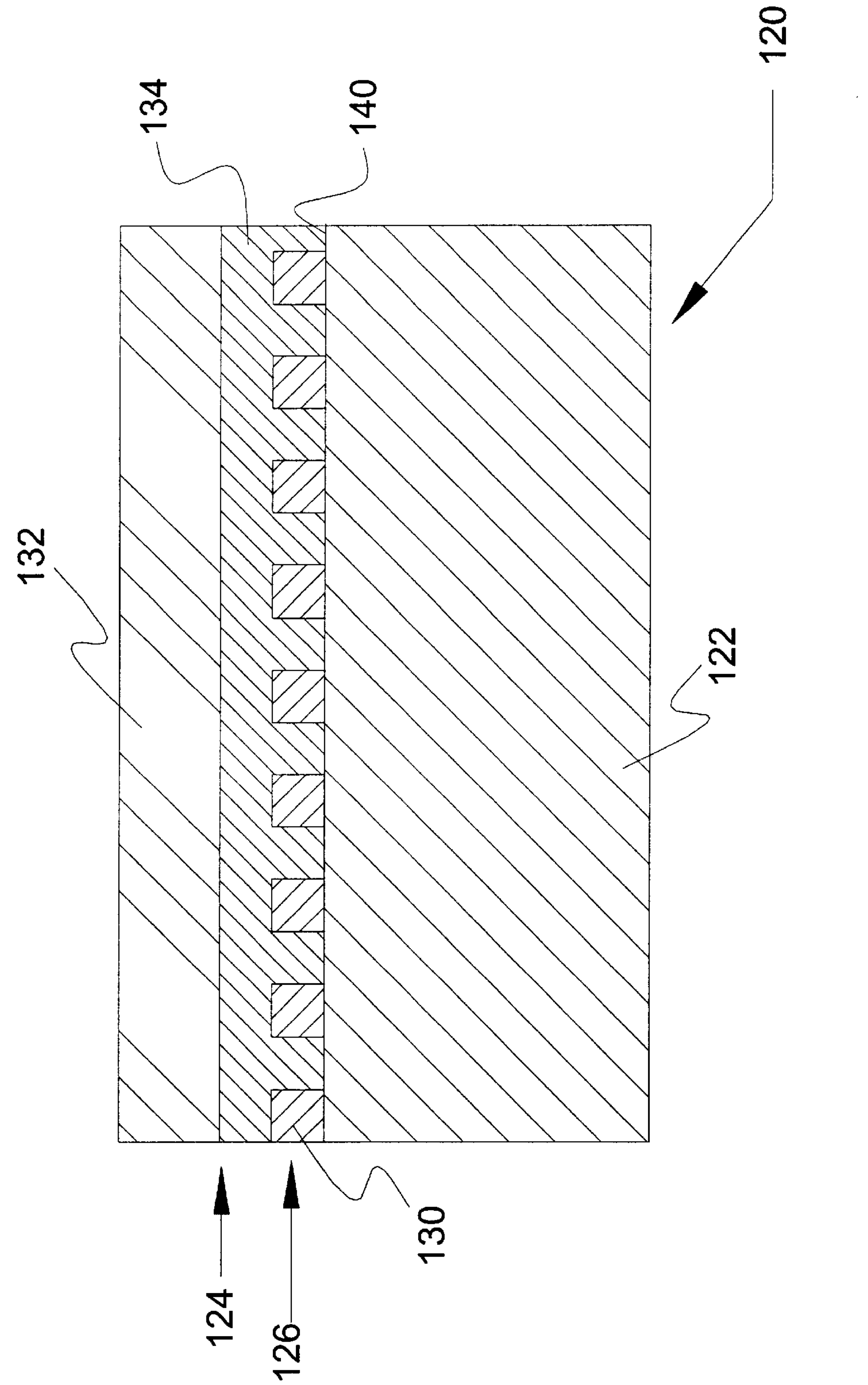
FIG. 2 is a cross-sectional view of a multiple-layered structure in accordance with an additional exemplary embodiment of the present invention.

FIG. 2 is a cross-sectional view of an additional embodiment of a multi-layered structure 120 in accordance with an exemplary embodiment of the present invention. Multi-layered structure 120 includes a substrate 122 and an ink receptive layer 126 overlaying a top surface 140 of substrate 122. In the embodiment of FIG. 2, ink receptive layer 126 comprises one or more projections 130. Ink receptive layer 126 may be formed by selectively applying a coating solution to top surface 140 of substrate 122. Processes which may be utilized to form projection(s) 130 of ink receptive layer 126 include rotogravure printing and screen printing. Multi-layered structure 120 also includes a laminate 124 having a top layer 132 and a bottom layer 134. In a preferred embodiment, bottom layer 134 comprises a tie material that bonds well to top surface 140. Examples of tie materials which may be suitable in some applications include, functionalized olefins include anhydride modified polypropylene, acid modified polyolefins, and acid/anhydride modified polyolefins. Examples of commercially available materials which may be suitable in some applications include ELVAX 3175 ethylene vinyl acetate polymer, and BYNEL 3101 acid/acrylate-modified ethylene vinyl acetate polymer, ELVALOY 741 resin modifier, and FUSABOND polymeric coupling agent which are all commercially available from E.I. DuPont de Nemours and Company of Wilmington, Del. In this preferred embodiment, heat and pressure may be utilized to bond laminate 124 to substrate 122 and/or ink receptive layer 122. In the embodiment of FIG. 2, the material of bottom layer 134 extends between projection(s) 130 and contacts top surface 140 of substrate 122.

In a useful embodiment, the ratio of the area of top surface 140 of substrate 122 not covered by projection(s) 130 to the area of top surface 140 of substrate 122 covered by projection(s) 130 is between about 0.02 and about 4. In a preferred embodiment, the ratio of the area of top surface 140 of substrate 122 not covered by projection(s) 130 to the area of top surface 140 of substrate 122 covered by projection(s) 130 is between about 0.05 and about 2. In a particularly preferred embodiment, the ratio of the area of top surface 140 of substrate 122 not covered by projection(s) 130 to the area of top surface 140 of substrate 122 covered by projection(s) 130 is between about 0.15 and about 1. In each of the preferred embodiments of this paragraph, the ratio applies to a "region" of the substrate, it being understood that a substantial area outside the "region" may not be covered by projections if the desired benefits of the present invention are not desired outside that region.

Figure 3:
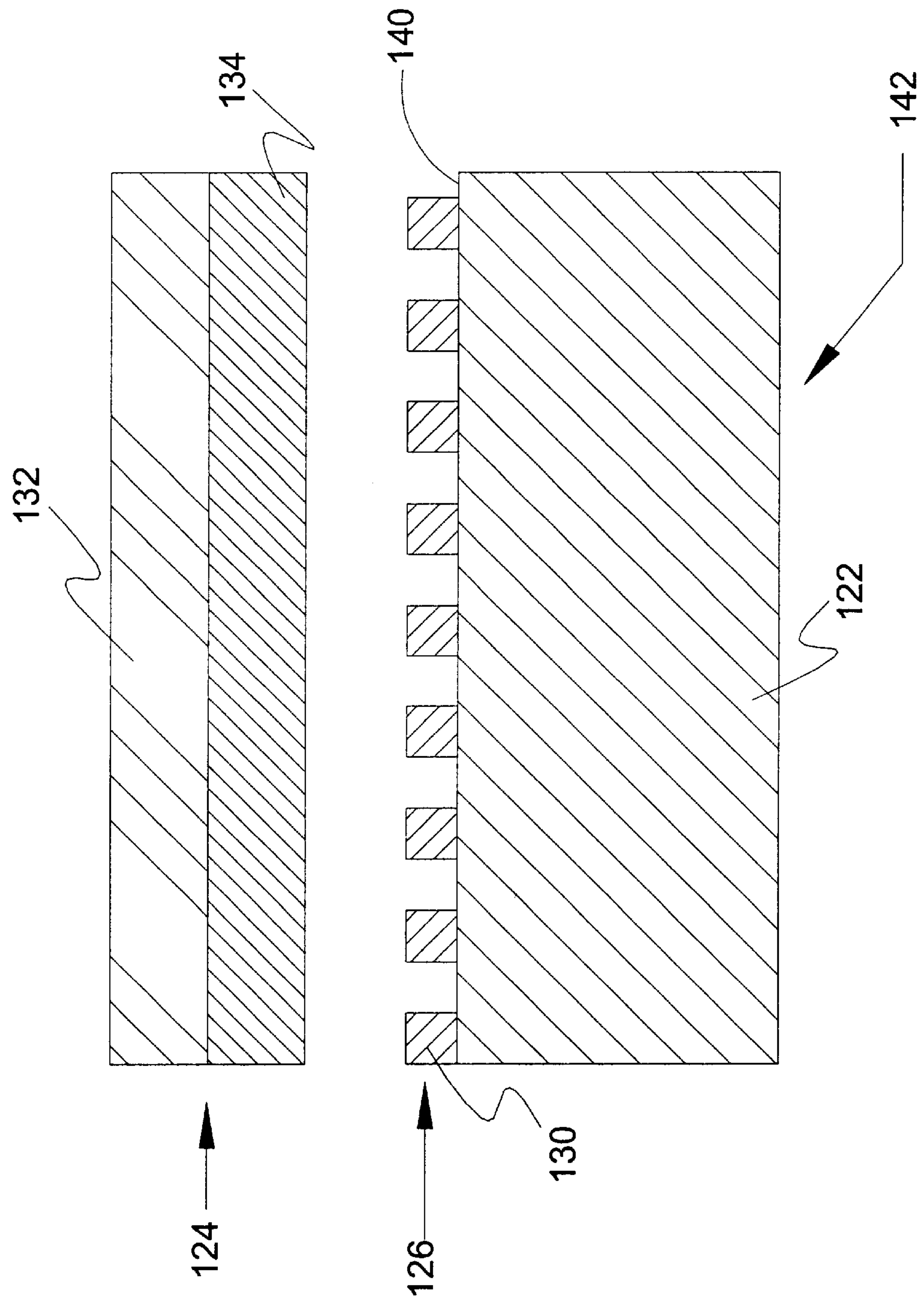
FIG. 3 is an exploded cross-sectional view of an assembly in accordance with an exemplary embodiment of the present invention.

FIG. 3 is an exploded cross-sectional view of an assembly 142 in accordance with an exemplary embodiment of the present invention. Assembly 142 includes a laminate 124, a substrate 122, and an ink receptive layer 126 overlaying a top surface 140 of substrate 122. In the embodiment of FIG. 3, ink receptive layer 126 comprises one or more projections 130. Laminate 124 includes a top layer 132 and a bottom layer 134. As described above, bottom layer 134 preferably comprises a tie material that bonds well to top surface 140.

In one method in accordance with the present invention, assembly 142 may be utilized to fabricate multi-layered structure 120 of FIG. 2. In a preferred method in accordance with the present invention heat and/or pressure are utilized to bond laminate 124 to substrate 122 and/or ink receptive layer 122. In this preferred method, the material of bottom layer 134 preferably flows between projection(s) 130 and contacts top surface 140 of substrate 122.

Figure 4:
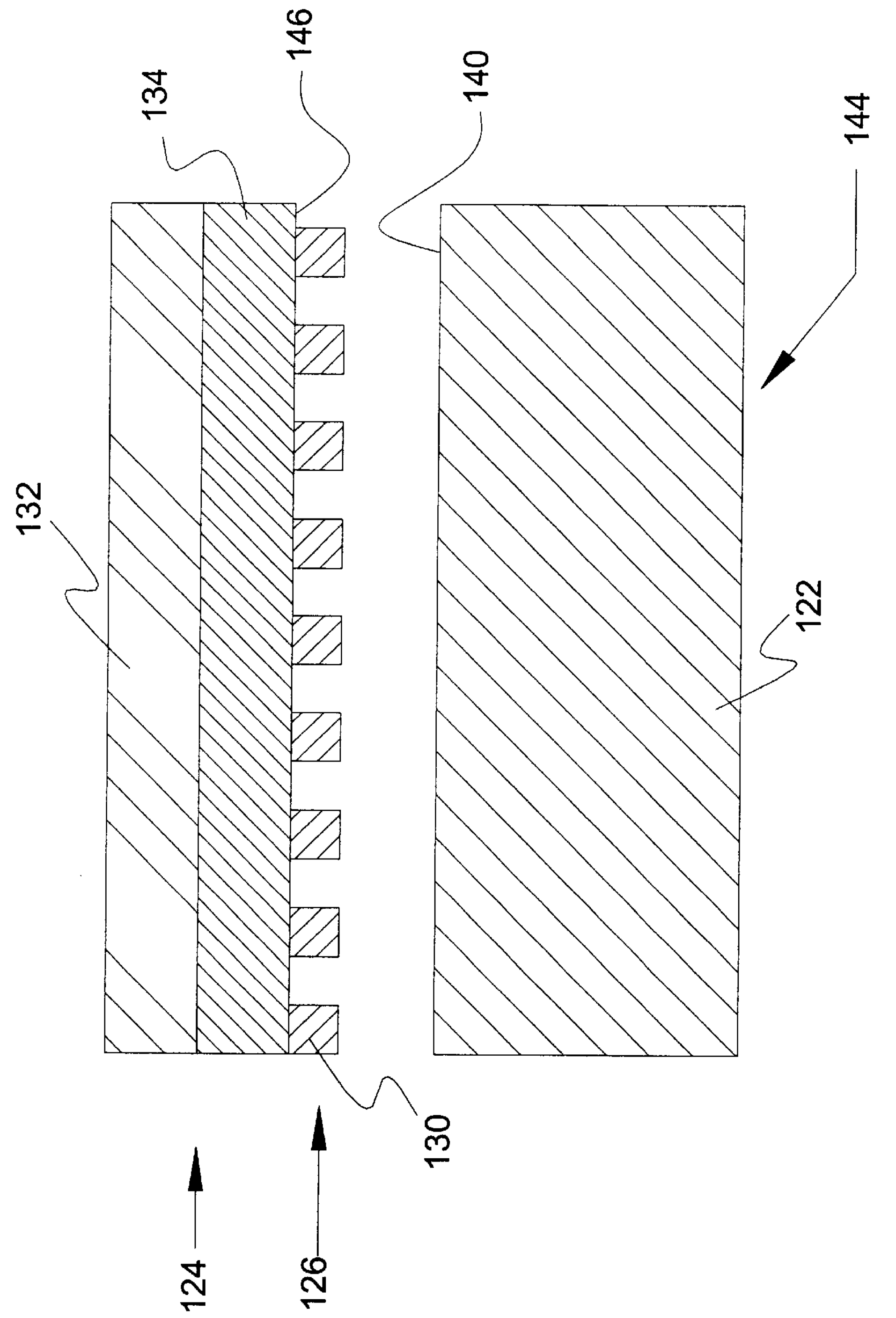
FIG. 4 is an exploded cross-sectional view of an additional assembly in accordance with an exemplary embodiment of the present invention.

FIG. 4 is an exploded cross-sectional view of an assembly 144 in accordance with an exemplary embodiment of the present invention. Assembly 144 includes a substrate 122 and a laminate 124 including a top layer 132 and a bottom layer 134. As described above, bottom layer 134 preferably comprises a tie material that bonds well to top surface 140. Assembly 144 also includes an ink receptive layer 126 overlaying a bottom surface 146 of laminate 124. In the embodiment of FIG. 4, ink receptive layer 126 comprises one or more projections 130.

In one method in accordance with the present invention, assembly 144 may be utilized to fabricate multi-layered structure 120 of FIG. 2. In a preferred method in accordance with the present invention heat and pressure are utilized to bond laminate 124 to substrate 122. In this preferred method, the material of bottom layer 134 preferably flows between projection(s) 130 and contacts top surface 140 of substrate 122.

Substrate

In a useful embodiment, substrate 22 comprises a porous material. In a preferred embodiment, substrate 22 comprises a paper, such as passport paper. In a particularly preferred embodiment, substrate 22 comprises passport paper having one or more security features. Passport papers having security features which may be suitable in some applications are commercially available from Jon. Enschede en Zohnen Grafishe Inrichting B.V. of Haarlem, The Netherlands. In a preferred embodiment, substrate 22 includes one or more security markers. Examples of security markers which may be suitable in some applications include complex printed patterns, micro-printed identifiers, water marks, and ultraviolet fluorescing fibers.

Ink Receptive Layer

In a useful embodiment, ink receptive layer 26 comprises a plurality of particles which may be hydrophilic organic particles or inorganic particles. In a preferred embodiment, ink receptive layer 26 comprises a plurality of organic particles. In a more preferred embodiment, ink receptive layer 26 comprises a plurality of organic particles and a plurality of inorganic particles.

Suitable hydrophilic organic particles comprise water swellable, but preferably not water soluble at about 25° C., crosslinked homopolymers and copolymers of N-vinyllactams such as homopolymers and copolymers of N-vinylpyrrolidone and homopolymers and copolymers of N-vinylcaprolactam, homopolymers and copolymers of N-vinylimidazoles, homopolymers and copolymers of vinylpyridine, and substituted derivatives thereof. Homopolymers and copolymers of N-vinyllactams and N-vinylimidazoles are preferred. Crosslinked particles of poly(N-vinylpyrrolidone) and poly(N-vinylimidazole) are most preferred.

Crosslinked poly(vinylpyrrolidone) particles are available from BASF Corporation of Ludwigshafen, Germany which identifies them by, for example, the trade designations LUVICROSS and LUVICROSS M. Crosslinked poly (vinylpyrrolidone) particles are also commercially available from International Specialty Products of Wayne, N.J., USA which identifies them by, for example, the trade designation POLYPLASDONE, POLYCLAR, and DIVERGAN. Crosslinked vinylpyrrolidone-vinylimidazole copolymer particles are available from BASF Corporation of Ludwigshafen, Germany which identifies them by, for example, the trade designations LUVICROSS VI and LUVICROSS VI-M. A useful mean particle diameter for organic particles is between about 0.1 micron and about 400 microns. A preferred mean particle diameter for organic particles is between about 0.5 micron and about 100 microns. A more preferred mean particle diameter for organic particles is between about 1 micron and about 30 microns.

In a useful embodiment, the organic particles have the capacity to absorb ink. In a preferred embodiment, the organic particles have the capacity to mordant ink colorants. Examples of ink colorants include dyes and pigment suspensions. Because ink absorbing capacity may vary with the composition of the ink being absorbed, preferred absorbing capacities will be described in terms of water absorbing capacity. In a preferred embodiment, the organic particles have a water absorbing capacity of between 40 ml/g and 0.1 ml/g. In a more preferred embodiment, the organic particles have a water absorbing capacity of between 20 ml/g and 0.2 ml/g. In an even more preferred embodiment, the organic particles have a water absorbing capacity of between 10 ml/g and 0.5 ml/g.

Suitable inorganic particles comprise metal oxides. Preferred metal oxides include titanium oxides such as rutile, titanium monoxide, titanium sesquioxide; silicon oxides, such as silica, surfactant templated silica particles, zeolites, and surface treated derivatives thereof such as for example fluorinated silicas as described in PCT published Patent Appl. No. WO 99/03929 A1; aluminum oxides such as aluminas, for example boehmite, pseudo-boehmite, bayerite, mixed oxides such as aluminum oxyhydroxide, alumina particles having a silica core; zirconium oxides such as zirconia and zirconium hydroxide; and mixtures thereof. Silicon oxides and aluminum oxides are especially preferred.

Silica particles are commercially available from, for example, E. I. Du Pont de Nemours Corporation of Wilmington, Del., USA which identifies them with the trade designation LUDOX. Alumina particles are commercially available from, for example, Vista Chemical Company of Houston, Tex., USA which identifies them with the trade designation DISPAL. A preferred mean particle diameter for inorganic particles is between about 0.002 micron and about 30 microns. A more preferred mean particle diameter for inorganic particles is between about 0.10 micron and about 10 microns.

In a particularly preferred embodiment, ink receptive layer 26 comprises crosslinked poly(vinylpyrrolidone) particles. These particles are capable of adhering to a substrate comprising passport paper. In a preferred embodiment ink receptive layer 26 is generally porous. For example, ink receptive layer 26 may comprise a plurality of crosslinked poly(vinylpyrrolidone) particles defining a plurality of interstitial spaces. In a more preferred embodiment, ink receptive layer 26 defines a plurality of tortuous paths. In this more preferred embodiment, a plurality of the tortuous paths are preferably in fluid communication with first major surface 30 of ink receptive layer 26. In a particularly advantageous embodiment, a plurality of the tortuous paths extend between first major surface 30 of ink receptive layer 26 and second major surface 28 of ink receptive layer 26. It is believed that the plurality of tortuous paths may allow a fluid vehicle portion of ink 34 to pass through ink receptive layer 26 to be carried away by substrate 22. In a preferred embodiment, ink receptive layer 26 is capable of capturing the ink colorants near first major surface 30 of ink receptive layer 26 while allowing the fluid vehicle of the ink to pass through ink receptive layer 26 and to be carried away by substrate 22.

In a preferred embodiment, ink receptive layer 26 has a thickness of between about 2 microns to about 100 microns dry. In a more preferred embodiment, ink receptive layer 26 has a thickness of between about 5 microns to about 50 microns dry. It is believed that an ink receptive layer 26 in accordance with these preferred embodiments may allow material from laminate 24 to flow through ink receptive layer 26 and bond to substrate 22.

In some applications, it is useful to select the thickness of ink receptive layer 26 based on a desired particle size for the application. In a useful embodiment, ink receptive layer 26 has a thickness of between about 1 mean particle diameter and about 10 mean particle diameters. In a preferred embodiment, ink receptive layer 26 has a thickness of between about 1 mean particle diameter and about 5 mean particle diameters. In a particularly preferred embodiment, ink receptive layer 26 has a thickness of between about 1 mean particle diameter and about 2.5 mean particle diameters.

Ink receptive layer 26 may include one or more binders to help in holding the particles to the substrate, to the laminate, and to each other. A useful embodiment of ink receptive layer 26 generally comprises less than about 60% binder by weight. Preferably, ink receptive layer 26 comprises less than about 50% binder by weight. More preferably, ink receptive layer 26 comprises less than about 40% binder by weight. Preferred binders are substantially water insoluble in their solvent free state.

Useful binders have glass transition temperatures between about −125° C. and 125° C. Preferred binders have glass transition temperatures between about −50° C. and 50° C. More preferred binders have glass transition temperatures between about −30° C. and 30° C.

Preferred binders are polymers that comprise ethylene and/or vinyl acetate. More preferred binders comprise copolymers of ethylene, vinyl acetate, and a monomer with acid functionality (e.g., acrylic acid, methacrylic acid). Examples of commercially available binders which may be suitable in some applications include, AIRFLEX 426 (64% solids), HYCAR 26084 (48% solids), VYCAR 460X46 (49% solids), RHOPLEX B-60A (46% solids), and RHOPLEX AC-1230M (46% solids). AIRFLEX 426 is an ethylene-vinyl acetate latex binder emulsion available from Air Products and Chemicals of Allentown, Pa., USA. HYCAR 26084 and VYCAR 460X46 are acrylic and vinyl chloride latex binder emulsions available from B.F. Goodrich Co., of Philadelphia, Pa., USA. RHOPLEX B-60A and RHOPLEX AC-1230M are acrylic latex binder emulsions, available from Rohm and Haas Company of Philadelphia, Pa., USA.

In a preferred embodiment, ink receptive layer includes one or more covert markers which may be utilized to verify the authenticity of multi-layered structure 20. Examples of covert markers include ultraviolet fluorescing fibers, ultraviolet fluorescing dyes, and color shifting pigments. Also in a preferred embodiment, ink receptive layer 26 is substantially optically transparent. An ink receptive layer 26 which is substantially optically transparent has the advantage that the security markers of substrate 22 may be viewed through the ink receptive layer 26. Examples of security markers which may be suitable in some applications include complex printed patterns, micro-printed identifiers, water marks, and ultraviolet fluorescing fibers.

It is to be appreciated that ink receptive layer 26 may include various additives without deviating from the spirit and scope of the present invention. Examples of additives which may be suitable in some applications include dyes, colorants, pigments, fillers, lubricants, anti-oxidants, ultraviolet light stabilizers, heat stabilizers, surfactants, defoamers, viscosity modifiers, and the like.

In a useful embodiment, the image receptive layer has a weight of between about 0.5 and about 250 g/m$^2$. In a preferred embodiment, the image receptive layer has a weight of between about 1 and about 100 g/m$^2$. In a particularly preferred embodiment, the image receptive layer has a weight of between about 2 and about 50 g/m$^2$. It is to be appreciated that the coating weight can vary depending on fillers, inorganic materials, additives, etc.

When patterning the ink receptive layer 126, a variety of ink receptive materials maybe used. Examples of materials which may be suitable in some applications include vinylpyrrolidone homopolymers and copolymers and substituted derivatives thereof; vinyl acetate copolymers (e.g., copolymers of vinylpyrrolidone and vinyl acetate; copolymers of vinyl acetate and acrylic acid, etc.) and hydrolyzed derivatives thereof; polyvinyl alcohol; acrylic acid homopolymers and copolymers; acrylamide homopolymers and copolymers; cellulosic polymers; styrene copolymers with allyl alcohol, acrylic acid and/or maleic acid or esters thereof; alkylene oxide polymers and copolymers; gelatins and modified gelatins; polysaccharides; and the like as disclosed in U.S. Pat. Nos. 5,766,398; 4,775,594; 5,126,195; 5,198,306. Vinylpyrrolidone homopolymers and copolymers are preferred. Crosslinked vinylpyrrolidone homopolymers and copolymers are particularly preferred. Optionally, image receptive material 126 may include inorganic materials (e.g., alumina and/or silica particles). Additionally, blends consisting of any of the above mentioned materials may be used. Optionally, the image receptive material 126 may also include additives that provide a visual property to the image. Such additives include glitter, glass bubbles, pigments, mica, UV absorbers and stabilizers, etc.

Coating Solution and Methods

Ink receptive layer 26, 126 may be formed utilizing various processes without deviating from the spirit and scope of the present invention. In a preferred embodiment, ink receptive layer 26, 126 is formed by applying a coating solution to substrate 22, 122. Various methods may be utilized to apply the coating solution to the substrate without deviating from the spirit and scope of the present invention. Examples of application techniques which may be suitable in some applications include coating, printing, dipping, spraying, and brushing. Examples of coating processes which may be suitable in some applications include direct and reverse roll coating, slot fed knife coating, spray coating, flood coating, and extrusion coating. Examples of printing processes which may be suitable in some applications include screen printing and rotogravure printing.

In a particularly preferred method in accordance with the present invention, the coating solution is selectively applied to substrate 22, 122 to form a pattern of projections. In this particularly preferred method, the rheological properties of the coating solution may be adjusted so that the coating solution is unlikely to form a uniform film over the surface. A coating solution used in conjunction with this preferred method, may preferably include a thickener. In a particularly preferred embodiment, the thickener may be selected to provide a combination of high viscosity at low shear rates and low viscosity at high shear rates. Examples of thickeners which may be suitable in some applications include: starch, gum arabic, guar gum, and carboxymethylcellulose.

A coating solution in accordance with the present invention may comprise various materials without deviating from the spirit and scope of the present invention. In a useful embodiment, the coating solution comprises a solvent and a plurality of particles which may be organic or inorganic. In a preferred embodiment, the coating solution comprises a solvent and a plurality of organic particles. In a particularly preferred embodiment, the coating solution comprises a solvent, a plurality of organic particles, and a plurality of inorganic particles. When the coating is applied to substrate 22, 122 to form a pattern of projections, the projections are preferably wider than the particles. The particles are also preferably insoluble in the solvent.

Examples of particles which may be suitable in some applications include alumina, silica, and hydrophilic organic particles. Suitable hydrophilic organic particles comprise crosslinked homopolymers and copolymers of N-vinyllactams such as homopolymers and copolymers of N-vinylpyrrolidone and homopolymers and copolymers of N-vinylcaprolactam, homopolymers and copolymers of N-vinylimidazoles, homopolymers and copolymers of vinylpyridine, and substituted derivatives thereof. Homopolymers and copolymers of N-vinyllactams and N-vinylimidazoles are preferred. Crosslinked particles of poly(N-vinylpyrrolidone) and poly(N-vinylimidazole) are most preferred.

The coating solution may include various solvents without deviating from the spirit and scope of the present invention. In a preferred embodiment, the solvent and the particles of the coating solution are selected so that the particles are substantially insoluble in the solvent. Preferable solvents comprise water and/or glycol ethers (e.g., diethylene glycol).

In some applications it may be advantageous to include a surfactant in the coating solution to aid in wetting the substrate. Examples of surfactants which may be suitable in some applications include anionic surfactants, cationic surfactants, nonionic surfactants, and zwitterionic surfactants. Examples of trade designations for surfactants include ZONYL and FLUORAD. ZONYL FSN is a trade designation for a fluorinated surfactant available from E. I. Du Pont de Nemours Corporation of Wilmington, Del., USA. FLUORAD FC-754 WELL STIMULATION ADDITIVE is a trade designation for a fluorinated surfactant available from Minnesota Mining and Manufacturing (3M Company) of St. Paul, Minn., USA.

The quantity of the surfactant may be selected to obtain the desired wetting characteristics. Useful wetting may be obtained when the surface tension of the coating solution is generally less than the wetting tension of the substrate material. Advantageous wetting may be obtained when the surface tension of the coating solution is less than the wetting tension of the substrate material by a difference of about 5 mJ/m$^2$ or more. Particularly advantageous wetting may be obtained when the surface tension of the coating solution is less than the wetting tension of the substrate material by a difference of about 10 mJ/m$^2$ or more. By way of example, untreated polypropylene typically has a surface tension of about 29 mJ/m$^2$. A corresponding useful coating solution in accordance with the present invention has a surface tension of less than about 29 mJ/m$^2$. A preferred coating solution in accordance with the present invention has a surface tension of less than about 24 mJ/m$^2$. A particularly preferred coating solution in accordance with the present invention has a surface tension of less than about 19 mJ/m$^2$.

Useful surfactants for application by screen printing may be cationic, anionic, nonionic. A preferred surfactant for application by screen printing is a cationic surfactant. A useful solution for application by screen printing may comprise between about 0% and about 50% glycol ether. A preferred solution for application by screen printing may comprise between about 5% and about 40% glycol ether. A particularly preferred solution for application by screen printing may comprise between about 10% and about 35% glycol ether.

A method in accordance with the present invention may include a surface treatment step to alter the wetting tension of the substrate material. Examples of surface treatment processes which may be suitable in some applications include plasma treating, corona treating, chemical treating, and flame treating. Flame treating equipment which may be suitable in some applications is commercially available from Flynn Burner Corporation of New Rochelle N.Y., USA; The Aerogon Company Ltd. of Alton, United Kingdom; and Sherman Treaters Ltd. of Thame, United Kingdom. Corona treating equipment which may be suitable in some applications is commercially available from Enercon Industries Corporation of Menomonee Falls, Wis., USA; Pillar Technologies of Hartland, Wis., USA; and Corotec Corporation of Farmington, Conn., USA.

As described above, the coating solution preferably includes a plurality of organic particles, and/or a plurality of inorganic particles. Suitable hydrophilic organic particles comprise crosslinked homopolymers and copolymers of N-vinyllactams such as homopolymers and copolymers of N-vinylpyrrolidone and homopolymers and copolymers of N-vinylcaprolactam, homopolymers and copolymers of N-vinylimidazoles, homopolymers and copolymers of vinylpyridine, and substituted derivatives thereof. Homopolymers and copolymers of N-vinyllactams and N-vinylimidazoles are preferred. Crosslinked particles of poly(N-vinylpyrrolidone) and poly(N-vinylimidazole) are most preferred.

Crosslinked poly(vinylpyrrolidone) particles are available from BASF Corporation of Ludwigshafen, Germany which identifies them by, for example, the trade designations LUVICROSS and LUVICROSS M. Crosslinked poly (vinylpyrrolidone) particles are also commercially available from International Specialty Products of Wayne, N.J., USA which identifies them by, for example, the trade designation POLYPLASDONE, POLYCLAR, and DIVERGAN. Crosslinked vinylpyrrolidone-vinylimidazole copolymer particles are available from BASF Corporation of Ludwigshafen, Germany which identifies them by, for example, the trade designations LUVICROSS VI and LUVICROSS VI-M. A useful mean particle diameter for organic particles is between about 0.1 micron and about 400 microns. A preferred mean particle diameter for organic particles is between about 0.5 micron and about 100 microns. A more preferred mean particle diameter for organic particles is between about 1 micron and about 30 microns.

Suitable inorganic particles comprise metal oxides. Preferred metal oxides include titanium oxides such as rutile, titanium monoxide, titanium sesquioxide; silicon oxides, such as silica, surfactant templated silica particles, zeolites, and surface treated derivatives thereof such as for example fluorinated silicas as described in PCT published Patent Appl. No. WO 99/03929 A1; aluminum oxides such as aluminas, for example boehmite, pseudo-boehmite, bayerite, mixed oxides such as aluminum oxyhydroxide, alumina particles having a silica core; zirconium oxides such as zirconia and zirconium hydroxide; and mixtures thereof. Silicon oxides and aluminum oxides are especially preferred.

Silica particles are commercially available from, for example, E. I. Du Pont de Nemours Corporation of Wilmington, Del., USA which identifies them with the trade designation LUDOX. Alumina particles are commercially available from, for example, Vista Chemical Company of Houston, Tex., USA which identifies them with the trade designation DISPAL. A preferred mean particle diameter for inorganic particles is between about 0.002 micron and about 30 microns. A more preferred mean particle diameter for inorganic particles is between about 0.010 micron and about 10 microns.

Printed Image

In a preferred embodiment, ink receptive layer 26, 126 is capable of receiving a printed image comprising aqueous ink. In a preferred method, the image is printed onto ink receptive layer 26, 126 utilizing an inkjet printing process. Other printing methods may be utilized without deviating from the spirit and scope of the present invention. Examples of printing methods which may be suitable in some applications include laser printing, gravure printing, offset printing, silk screen printing, electrostatic printing, and flexographic printing.

In a preferred method in accordance with the present invention, printed image 32 is applied to ink receptive layer 26, 126 utilizing an inkjet printing process. One advantage of the inkjet printing process is that inkjet printing equipment is readily available at low cost. A second advantage of the inkjet printing process is that inkjet printers may create photographic quality color images with no set up costs (e.g., printing plates and the like) provided they are used with a suitable substrate.

A printed image in accordance with the present invention preferably includes one or more security indicia. Examples of security indicia which may be suitable in some applications include, a picture of a human face, a representation of a human fingerprint, a bar code, and a representation of a cardholder's signature.

Many inks may be utilized in conjunction with the present invention. Examples of inks which may be suitable in some applications include organic solvent based inks, water-based inks, phase change inks, and radiation polymerizable inks. Preferred inks are water based inks. More preferred inks, are water based inks which are suitable for use in an inkjet printer. Inks utilizing various colorants may be utilized in conjunction with the present invention. Examples of colorants which may be suitable in some applications include dye based colorants, and pigment based colorants.

Laminate

In a preferred embodiment, laminate 24, 124 comprises an optically transparent film. In a preferred embodiment, laminate 24, 124 is bonded to ink receptive layer 26, 126. In a particularly preferred embodiment, laminate 24, 124 is bonded to ink receptive layer 26, 126 and substrate 22, 122.

Various methods may be utilized to bond laminate 24, 124 to ink receptive layer 26, 126. In a preferred embodiment, pressure is utilized to form a bond. In a particularly preferred embodiment, heat and pressure are utilized to form a bond. Examples of pressure application methods which may be suitable in some applications include the use of a roller press and the use of a platen press. Examples of heating methods which may be suitable in some applications include heating methods utilizing conduction, convection, and radiation.

In a preferred method in accordance with the present invention, a one or more heated rollers are utilized to apply heat and pressure to laminate 24, 124 and substrate 22, 122. In a preferred method in accordance with the present invention, laminate 24, 124 is bonded to ink receptive layer 26, 126 and substrate 22, 122 utilizing a thermal laminator such as, for example, a TLC Model 6060P passport laminator (available from TLC of Evenston, Ill.).

It should be appreciated that laminate 24, 124 may comprise a plurality of layers without deviating from the spirit and scope of the present invention. For example, laminate 24, 124 may comprise a base layer and a tie layer. By way of a second example, laminate 24, 124 may comprise a base layer and a pressure sensitive adhesive (PSA) layer.

Laminate 24, 124 may comprise various materials without deviating from the spirit and scope of the present invention. Examples of materials which may be suitable in some applications include polyethylene (PE), polypropylene (PP), poly(vinyl chloride) (PVC), polyurethanes (PU), and polyethylene terephthalate (PET). PET film is commercially available from E. I. Du Pont de Nemours Corporation of Wilmington, Del., USA which identifies this material with the trade designation MYLAR.

As described above, embodiments of laminate 24, 124 are possible in which laminate 24, 124 includes a tie layer. The tie layer may comprise various materials without deviating from the spirit and scope of the present invention. Examples of tie materials which may be suitable in some applications include polyethylene (PE), ethylene vinyl acetate copolymers (EVA), polyvinyl chloride (PVC)/vinyl acetate copolymers, acid/acrylate modified ethylene-vinyl acetate copolymers, acid/anhydride modified polyethylene, and ethylene-acrylic copolymers (e.g., PRIMACOR available from Dow Chemical).

Acid/acrylate modified ethylene vinyl acetate is commercially available from E. I. Du Pont de Nemours Corporation of Wilmington, Del., USA which identifies this material with the trade designation BYNEL. Acid/anhydride-modified polyethylene is commercially available from Equistar Chemicals LP of Houston, Tex., USA which identifies this material with the trade designation PLEXAR.

In a preferred embodiment, laminate 24, 124 includes one or more security markers. Examples of security markers which may be suitable in some applications include a security pattern comprising ultraviolet fluorescing ink and ultraviolet fluorescing fibers. In a particularly preferred embodiment, laminate 24, 124 comprises CONFIRM 1301 which is commercially available from 3M Company of St. Paul, Minn., USA. CONFIRM 1301 is a security laminate which includes an ethylene-acrylic acid tie layer.

Utility of the Invention

Ink receptive compositions in accordance with the present invention are useful to modify paper to render it printable to obtain an acceptable image with aqueous inks, particularly from an inkjet printer. Printed images on paper with the ink receptor composition applied provide an excellent image quality compared with paper without the ink receptor composition. The ink receptor composition is especially useful for security documents and other applications where a heat sealable laminate is to be adhered to the imaged article.

EXAMPLES

Materials

The materials utilized in the examples which follow are described below:

"CONFIRM 1301" is a security laminate with an ethylene-acrylic acid tie layer, available from 3M Company of St. Paul, Minn., USA.

"POLYPLASDONE INF-10" is a trade designation for crosslinked poly(vinylpyrrolidone) particles available from International Specialty Products of Wayne, N.J., USA.

"LUVICROSS VI-M" is a trade designation for crosslinked vinylpyrrolidone-vinylimidazole copolymer particles, available from BASF Corporation of Ludwigshafen, Germany.

"AIRFLEX 426" is a trade designation for ethylene-vinyl acetate latex binder emulsion, available from Air Products and Chemicals of Allentown, Pa., USA.

"HYCAR 26084" and "VYCAR 460X46" are trade designations for acrylic and vinyl chloride latex binder emulsions, available from B. F. Goodrich Co., of Philadelphia, Pa., USA.

"RHOPLEX B-60A" and "RHOPLEX AC-1230M" are trade designations for acrylic latex binder emulsions, available from Rohm and Haas Company of Philadelphia, Pa., USA.

"FLUORAD FC-754 WELL STIMULATION ADDITIVE" is a trade designation for a mixture of fluoroalkyl quaternary ammonium chlorides, 50 weight percent in isopropanol/water available from 3M Company of St. Paul, Minn., USA.

"ZONYL FSN" is a trade designation for a fluorinated surfactant available from E. I. Du Pont de Nemours Corporation of Wilmington, Del., USA.

General Procedures

The examples which follow were, in many cases, prepared utilizing the compositions listed immediately below. All amounts are given on a weight basis unless otherwise noted.

Composition A: A mixture of 20 parts POLYPLASDONE INF-10 and 80 parts water.

Composition B: A mixture of 20 parts POLYPLASDONE INF-10, 60 parts isopropyl alcohol, and 20 parts water.

Composition C: A mixture of 20 parts binder (on a solids basis) and 80 parts water (including water from the binder emulsion).

Composition D: A mixture of 100 parts POLYPLASDONE INF-10, 250 parts deionized water, and 200 parts diethylene glycol was prepared. This mixture was mixed with a rotor/stator type mixer for 15 minutes, then 67 parts AIRFLEX 426 EMULSION and 5 parts FLUORAD FC-754 WELL STIMULATION ADDITIVE where added.

Example 1

A mixture comprising 70 parts of Composition A, 30 parts of Composition C (prepared using AIRFLEX 426 as a binder), 25 parts water, and 0.7 parts ZONYL FSN was prepared.

This ink receptor composition was coated onto passport paper (commercially available from Jon. Enschede en Zohnen Grafishe Inrichting B.V. of Haarlem, The Netherlands) using a #22 Mayer rod (available from R D Specialties of Webster, N.Y., USA; nominal wet thickness= 0.050 mm), followed by drying in an oven at 110° C. The security features in the passport paper (e.g., preprinted pattern, watermarks, ultraviolet fluorescing fibers) could be clearly observed through the coating.

This material was then imaged using an EPSON STYLUS COLOR 850 inkjet printer (available from U S Epson, Inc. of Torrance, Calif., USA) equipped with pigment/dye blend inkjet inks (cartridges ARC-S020108 (black) and ARC-S020089 (color) from MIS Associates Inc. of Lake Orion, Mich., USA). The resulting image exhibited high color density and excellent line sharpness with no bleed or feathering between colors.

A piece of CONFIRM 1301 security laminate was placed on top of the image, and the construction was laminated using a TLC Model 6060P passport laminator with an interface temperature of about 115° C. Several such constructions were prepared.

Upon attempting to separate the laminate from the image at ambient conditions, the passport paper tore, indicating that the interfacial adhesion between the paper, coating, and laminate was greater than the internal strength of the paper.

A piece of the laminated sample was placed in each of a 66° C./98% relative humidity, a 32° C./90% relative humidity, and a 66° C./ambient humidity environment for 11 days. The various environmental conditions did not noticeably change the image quality. Significant force was required to attempt separation of the laminate from the image at a 32° C./90% relative humidity, and upon doing so the printed image split (leaving part of the image on the laminate and part remaining on the paper) such that neither the paper nor the laminate were reusable.

Example 2

An ink receptor composition was prepared as in Example 1, except that 65 parts of Composition A were used and 35 parts of Composition C were used. This ink receptor composition was coated, printed, and laminated as in Example 1. After coating, the security features in the passport paper were readily observed through the coating as in Example 1. The image quality after printing was similar to that of Example 1.

Upon attempting to separate the laminate from the image at ambient conditions, the passport paper tore, indicating that the interfacial adhesion between the paper, coating, and laminate was greater than the internal strength of the paper.

A piece of the laminated sample was placed in each of a 66° C./98% relative humidity, a 32° C./90% relative humidity, and a 66° C./ambient humidity environment for 11 days.

The various environmental conditions did not noticeably change the image quality. Similar force as in Example 1 was required to attempt separation of the laminate from the image at 32° C./90% relative humidity, and upon doing so the printed image split (leaving part of the image on the laminate and part remaining on the paper) such that neither the paper nor the laminate were reusable.

Example 3

An ink receptor composition was prepared as in Example 1, except that 75 parts of Composition A were used and 25 parts of Composition C were used. This ink receptor composition was coated, printed, and laminated as in Example 1. After coating, the security features in the passport paper were readily observed through the coating as in Example 1. The image quality after printing was similar to that of Example 1.

Upon attempting to separate the laminate from the image at ambient conditions, the passport paper tore, indicating that the interfacial adhesion between the paper, coating, and laminate was greater than the internal strength of the paper.

A piece of the laminated sample was placed in each of a 66° C./98% relative humidity, a 32° C./90% relative humidity, and a 66° C./ambient humidity environment for 11 days.

The various environmental conditions did not noticeably change the image quality. Slightly less force than in Example 1 was required to attempt separation of the laminate from the image at 32° C./90% relative humidity, and upon doing so the printed image split (leaving part of the image on the laminate and part remaining on the paper) such that neither the paper nor the laminate were reusable.

Example 4

An ink receptor composition was prepared as in Example 1, except that the binder used in Composition C was VYCAR 460X46. This ink receptor composition was coated, printed, and laminated as in Example 1. After coating, the security features in the passport paper were readily observed through the coating as in Example 1. The image quality after printing was similar to that of Example 1.

Significant force was required to attempt separation of the laminate from the image at ambient conditions, and upon doing so the printed image split (leaving part of the image on the laminate and part remaining on the paper) such that neither the paper nor the laminate were reusable.

A piece of the laminated sample was placed in a 32° C./90% relative humidity environment for 4 days. This environmental condition did not noticeably change the image quality. Slightly less force than in Example 1 was required to attempt separation of the laminate from the image at 32° C./90% relative humidity, and upon doing so the printed image split (leaving part of the image on the laminate and part remaining on the paper) such that neither the paper nor the laminate were reusable.

Example 5

An ink receptor composition was prepared as in Example 1, except that the binder used in Composition C was HYCAR 26084. This ink receptor composition was coated, printed, and laminated as in Example 1. After coating, the security features in the passport paper were readily observed through the coating as in Example 1. The image quality after printing was similar to that of Example 1.

Similar force as in Example 4 was required to attempt separation of the laminate from the image at ambient conditions, and upon doing so the printed image split (leaving part of the image on the laminate and part remaining on the paper) such that neither the paper nor the laminate were reusable.

A piece of the laminated sample was placed in a 32° C./90% relative humidity environment for 4 days. This environmental condition did not noticeably change the image quality. Similar force as in Example 4 was required to attempt separation of the laminate from the image at 32° C./90% relative humidity, and upon doing so the printed image split (leaving part of the image on the laminate and part remaining on the paper) such that neither the paper nor the laminate were reusable.

Example 6

An ink receptor composition was prepared as in Example 1, except that the binder used in Composition C was an 80:20 blend (on a solids basis) of RHOPLEX B-60A with RHOPLEX AC-1230M. This ink receptor composition was coated, printed, and laminated as in Example 1. After coating, the security features in the passport paper were readily observed through the coating as in Example 1. The image quality after printing was similar to that of Example 1.

Slightly less force than in Example 4 was required to attempt separation of the laminate from the image at ambient conditions, and upon doing so the printed image split (leaving part of the image on the laminate and part remaining on the paper) such that neither the paper nor the laminate were reusable.

A piece of the laminated sample was placed in a 32° C./90% relative humidity environment for 4 days. This environmental condition did not noticeably change the image quality. Slightly less force than in Example 4 was required to attempt separation of the laminate from the image at 32° C./90% relative humidity, and upon doing so the printed image split (leaving part of the image on the laminate and part remaining on the paper) such that neither the paper nor the laminate were reusable.

Example 7

Composition B was prepared as the ink receptor composition. This ink receptor composition was coated as in Example 1, except that a #14 Mayer rod (nominal wet thickness=0.032 mm) was used. The coated paper was printed and laminated as in Example 1. After coating, the security features in the passport paper were readily observed through the coating as in Example 1. The image quality after printing was similar to that of Example 1. Upon attempting separation of the laminate from the image at ambient conditions, the passport paper tore, indicating that the interfacial adhesion between the paper, coating, and laminate was greater than the internal strength of the paper.

Example 8

A mixture comprising 20 parts LUVICROSS VI-M, 60 parts isopropyl alcohol, and 20 parts water was prepared. This ink receptor composition was coated, printed, and laminated as in Example 7. After coating, the security features in the passport paper were readily observed through the coating as in Example 1. The image quality after printing was similar to that of Example 1. Upon attempting to separate the laminate from the image at ambient conditions, the passport paper tore, indicating that the interfacial adhesion between the paper, coating, and laminate was greater than the internal strength of the paper.

Example 9

Ink receptor Composition D was screen printed onto 10 point 110 pound paper (Springhill paper from International Paper) using a 157 mesh screen (61 threads/cm). The coated material was dried in an oven at 100° C. The dry material was then printed using an EPSON STYLUS COLOR 850 inkjet printer (available from U S Epson, Inc. of Torrance, Calif., USA) as in Example 1. The resulting image exhibited high color density and excellent line sharpness with no bleed or feathering between colors. A piece of CONFIRM 1301 security laminate was placed on top of the image, and the construction was laminated using a TLC MODEL 6060P PASSPORT LAMINATOR with an interface temperature of about 138° C. Upon attempting to separate the laminate from the image at ambient conditions, the paper tore, indicating that the interfacial adhesion between the paper, coating, and laminate was greater than the internal strength of the paper.

Example 10

Example 9 was repeated using a 230 mesh screen (90 threads/cm). Image quality and laminate adhesion were similar to those observed in Example 9.

Example 11

Example 9 was repeated except that the ink receptive composition was applied to the paper using a notch-bar coater with a 2 mil (0.051 mm) gap. Image quality and laminate adhesion were similar to those observed in Example 9.

Example 12

Ink receptor Composition D was screen printed onto the adhesive side of CONFIRM 1301 security laminate using a 110 mesh screen (43 threads/cm). The coated material was dried at 100° C. This material was then printed (image reversed) using an EPSON STYLUS COLOR 850 inkjet printer as in example 1. The resulting image exhibited high color density and good line sharpness with very slight bleed/feathering between colors. A piece of 10 point 110 pound paper (Springhill paper from International Paper) was placed on top of the image, and the construction was laminated using a TLC MODEL 6060P PASSPORT LAMINATOR with an interface temperature of about 138° C. The image quality was unchanged after lamination, and the image could be readily observed through the security laminate. Upon attempting to separate the laminate from the image at ambient conditions, the paper tore, indicating that the interfacial adhesion between the paper, coating, and laminate was greater than the internal strength of the paper. A piece of the laminated construction was placed in, water for about one hour. Upon attempting to separate the laminate from the image, the paper tore, leaving the laminate adhesive still completely covered with paper fibers.

Example 13

Example 12 was repeated using a 157 mesh screen. The image exhibited high color density with slightly more bleed/feathering than in Example 12. After lamination to the paper, the adhesion at ambient conditions between the paper and the security laminate was similar to that observed in Example 12. A piece of the laminated construction was placed in water for about one hour. Upon attempting to separate the laminate from the image, the paper tore, leaving the laminate adhesive mostly covered (less than in Example 12) with paper fibers.

Example 14

Example 12 was repeated using a 230 mesh screen. The image exhibited high color density with more bleed/feathering than in Example 13. After lamination to the paper, the adhesion at ambient conditions between the paper and the security laminate was similar to that observed in Example 12. A piece of the laminated construction was placed in water for about one hour. Upon attempting to separate the laminate from the image, the paper tore slightly, leaving the laminate adhesive with some (less than in Example 13) paper fibers still attached.

Example 15 (comparative)

Example 12 was repeated except that the ink receptive composition was applied to the adhesive side of CONFIRM 1301 security laminate using a notch-bar coater with a 2 mil (0.051 mm) gap. After lamination, the paper could be separated from the laminate using moderate force, indicating that the interfacial adhesion between the paper, coating, and laminate was less than the internal strength of the paper.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An image retaining assembly, comprising;

a substrate;

a laminate; and an image receptive layer disposed between the laminate and the substrate;

the image receptive layer comprising hydrophilic organic particles and where the laminate and the substrate each has greater internal strength than the image receptive layer.

2. The image retaining assembly of claim 1, wherein the image receptive layer comprises crosslinked hydrophilic organic particles.

3. The image retaining assembly of claim 2, wherein the image receptive layer comprises poly(N-vinylpyrrolidone).

4. The image retaining assembly of claim 2, wherein the image receptive layer comprises poly(N-vinylimidazole).

5. The image retaining assembly of claim 2, wherein the image receptive layer comprises poly(N-vinyllactams).

6. The image retaining assembly of claim 2, wherein the image receptive layer comprises poly(N-vinycaprolactam).

7. The image retaining assembly of claim 2, wherein the substrate comprises a porous substrate.

8. The image retaining assembly of claim 1, wherein the particles of the image receptive layer define interstitial spaces.

9. The image retaining assembly of claim 1, wherein the particles of the image receptive layer define a plurality of tortuous paths extending between a first major surface and a second major surface of the image receptive layer.

10. The image retaining assembly of claim 1, wherein the particles of the image receptive layer have a mean diameter of between about 0.1 micron and about 400 microns.

11. The image retaining assembly of claim 1, wherein the particles of the image receptive layer have a mean diameter of between about 0.5 micron and about 100 microns.

12. The image retaining assembly of claim 1, wherein the particles of the image receptive layer have a mean diameter of between about 1 micron and about 30 microns.

13. The image retaining assembly of claim 1, wherein the image receptive layer has a thickness of between about 1 mean particle;diameter and about 10 mean particle diameters.

14. The image retaining assembly of claim 1, wherein the image receptive layer has a thickness of between about 1 mean particle diameter and about 2.5 mean particle diameters.

15. The image retaining assembly of claim 1, wherein the image receptive layer has a thickness of between about 2 microns and about 100 microns.

16. The image retaining assembly of claim 1, wherein the image receptive layer has a thickness of between about 5 microns and about 50 microns.

17. The image retaining assembly of claim 1, wherein the substrate comprises paper.

18. The image retaining assembly of claim 1, wherein the substrate comprises passport paper having at least on security feature.

19. The image retaining assembly of claim 1, wherein the image receptive layer further includes a binder.

20. The image retaining assembly of claim 1, wherein the image receptive layer further includes a binder, comprising ethylene.

21. The image retaining assembly of claim 1, wherein the image receptive layer further includes a binder, comprising vinyl acetate.

22. The image retaining assembly of claim 1, wherein the image receptive layer further includes ethylene and vinyl acetate.

23. The image retaining assembly of claim 1, wherein the image receptive layer further includes a binder, comprising a copolymer of ethylene, vinyl acetate, and a monomer with acid functionality.

24. The image retaining assembly of claim 1, wherein the laminate is fixed to the image receptive layer with an adhesive.

25. The image retaining assembly of claim 1, wherein the laminate is heat sealed to the image receptive layer.

26. The image retaining assembly of claim 1, wherein the laminate is heat sealed to the image receptive layer and the substrate.

27. The image retaining assembly of claim 1, wherein the laminate overlaying the image receptive layer includes a tie layer.

28. The image retaining assembly of claim 1, wherein the laminate overlaying the image receptive layer includes a tie layer comprising ethylene-acrylic acid copolymer.

29. The image retaining assembly of claim 1, wherein the laminate overlaying the image receptive layer includes a tie layer comprising ethylene-vinyl acetate copolymer.

30. The image retaining assembly of claim 1, wherein the laminate overlaying the image receptive layer is optically transparent.

31. The image retaining assembly of claim 1, wherein the image receptive layer is optically transparent.

32. The image retaining assembly of claim 1, wherein the particles have a water absorbing capacity of between 40 ml/g and 0.1 ml/g.

33. The image retaining assembly of claim 1, wherein the particles have a water absorbing capacity of between 20 ml/g and 0.2 ml/g.

34. The image retaining assembly of claim 1, wherein the particles have a water absorbing capacity of between 10 ml/g and 0.5 ml/g.

35. The image retaining assembly of claim 1, wherein the image receptive layer has a weight of between about 0.5 $g/m^2$ and about 250 $g/m^2$.

36. The image retaining assembly of claim 1, wherein the image receptive layer has a weight of between about 1 $g/m^2$ and about 100 $g/m^2$.

37. The image retaining assembly of claim 1, wherein the image receptive layer has a weight of between about 2 $g/m^2$ and about 50 $g/m^2$.

38. The image retaining assembly of claim 2, wherein the image receptive layer comprises poly(vinylpyridine).

39. Image retaining assembly, comprising;

a substrate;

a laminate; and an image receptive layer comprising one or more projections disposed between the laminate and the substrate, where the aggregate area of the one or more projections is less than the area of the substrate.

40. The image retaining assembly of claim 39, wherein each projection of the image receptive layer comprises one or more crosslinked hydrophilic organic particles.

41. The image retaining assembly of claim 39, wherein the image receptive layer comprises poly(N-vinylpyrrolidone).

42. The image retaining assembly of claim 39, wherein the image receptive layer comprises poly(N-vinylimidazole).

43. The image retaining assembly of claim 39, wherein the image receptive layer comprises poly(N-vinyllactams).

44. The image retaining assembly of claim 39, wherein the image receptive layer comprises poly(N-vinycaprolactam).

45. The image retaining assembly of claim 40, wherein the image receptive layer comprises poly(vinylpyridine).

46. The image retaining assembly of claim 40, wherein the one or more particles have a mean diameter of between about 0.1 micron and about 400 microns.

47. The image retaining assembly of claim 40, wherein the one or more particles have a mean diameter of between about 0.5 micron and about 100 microns.

48. The image retaining assembly of claim 40, wherein the one or more particles have a mean diameter of between about 1 micron and about 30 microns.

49. The image retaining assembly of claim 39, wherein the substrate comprises a porous substrate.

50. The image retaining assembly of claim 39, wherein the substrate comprises paper.

51. The image retaining assembly of claim 39, wherein the laminate is fixed to the substrate and the image receptive layer with an adhesive.

52. The image retaining assembly of claim 39, wherein the laminate is heat sealed to the image receptive layer.

53. The image retaining assembly of claim 39, wherein the laminate is heat sealed to the image receptive layer and the substrate.

54. The image retaining assembly of claim 39, wherein the laminate overlaying the image receptive layer includes a tie layer.

55. The image retaining assembly of claim 39, wherein the laminate overlaying the image receptive layer includes a tie layer comprising ethylene-acrylic acid copolymer.

56. The image retaining assembly of claim 39, wherein the laminate overlaying the image receptive layer includes a tie layer comprising ethylene-vinyl acetate copolymer.

57. The image retaining assembly of claim 39, wherein the laminate overlaying the image receptive layer is optically transparent.

58. The image retaining assembly of claim 39, wherein the image receptive layer is optically transparent.

59. The image retaining assembly of claim 40, wherein the particles have a water absorbing capacity of between 40 ml/g and 0.1 ml/g.

60. The image retaining assembly of claim 40, wherein the particles have a water absorbing capacity of between 20 ml/g and 0.2 ml/g.

61. The image retaining assembly of claim 40, wherein the particles have a water absorbing capacity of between 10 ml/g and 0.5 ml/g.

62. The image retaining assembly of claim 39, wherein the image receptive layer has a weight of between about 0.5 $g/m^2$ and about 250 $g/m^2$.

63. The image retaining assembly of claim 39, wherein the image receptive layer has a weight of between about 1 $g/m^2$ and about 100 $g/m^2$.

64. The image retaining assembly of claim 39, wherein the image receptive layer has a weight of between about 2 $g/m^2$ and about 50 $g/m^2$.

65. The image retaining assembly of claim 39, wherein the image receptive area includes a region in which a ratio of an area of substrate not covered by the one or more projections to an area of the substrate covered by the one or more projections is between about 0.02 and about 4.

66. The image retaining assembly of claim 39, wherein the image receptive area includes a region in which a ratio of an area of substrate not covered by the one or more projections to an area of the substrate covered by the one or more projections is between about 0.05 and about 2.

67. The image retaining assembly of claim 39, wherein the image receptive area includes a region in which a ratio of an area of substrate not covered by the one or more projections to an area of the substrate covered by the one or more projections is between about 0.15 and about 1.

* * * * *

UNITED STATES PATENT AND TRADEMARK OFFICE

CERTIFICATE OF CORRECTION

PATENT NO. : 6,506,478 B1 
DATED : January 14, 2003
INVENTOR(S) : Schulz, Mark F.

It is certified that error appears in the above-identified patent and that said Letters Patent is hereby corrected as shown below:

Column 17,
Line 62, "particle;diameter" should read -- particle diameter --.

Column 18,
Line 10, "at least on" should read -- at least one --.

Signed and Sealed this

Eighth Day of July, 2003

JAMES E. ROGAN
*Director of the United States Patent and Trademark Office*